(12) United States Patent  
Lai (10) Patent No.: US 9,849,903 B1
(45) Date of Patent: Dec. 26, 2017

(54) ASSEMBLING STRUCTURE OF DOUBLE STROLLER

(71) Applicant: TUNG TZU INDUSTRIAL CO., LTD., Tainan (TW)

(72) Inventor: Chin-I Lai, Tainan (TW)

(73) Assignee: Tung Tzu Industrial Co., Ltd., Tainan (TW)

( * ) Notice: Subject to any disclaimer, the term of this patent is extended or adjusted under 35 U.S.C. 154(b) by 0 days.

(21) Appl. No.: 15/373,836

(22) Filed: Dec. 9, 2016

(51) Int. Cl.
*B62B 7/10* (2006.01)
*B62B 9/12* (2006.01)
*B62B 7/00* (2006.01)
*B62B 7/14* (2006.01)

(52) U.S. Cl.
CPC ............... *B62B 9/12* (2013.01); *B62B 7/008* (2013.01); *B62B 7/14* (2013.01)

(58) Field of Classification Search
CPC ................................................ B62B 7/008
USPC ............... 280/47.38, 47.4, 642, 647, 650
See application file for complete search history.

(56) References Cited

U.S. PATENT DOCUMENTS

| | | | | |
|---|---|---|---|---|
| 4,725,071 A * | 2/1988 | Shamie | ............... | B62B 7/08 280/47.4 |
| 4,858,947 A * | 8/1989 | Yee | ............... | B62B 7/08 280/47.35 |
| 4,886,289 A * | 12/1989 | Yee | ............... | B62B 7/08 280/47.35 |
| D321,850 S * | 11/1991 | Mong-Hsing | ........... | B62B 7/08 280/47.38 |
| 5,221,106 A * | 6/1993 | Shamie | ............... | B62B 7/08 280/47.4 |
| 5,338,096 A * | 8/1994 | Huang | ............... | B62B 7/142 280/30 |
| 6,267,406 B1 * | 7/2001 | Huang | ............... | B62B 7/08 280/47.38 |
| 6,843,498 B2 * | 1/2005 | Bretschger | ............ | B62B 7/083 280/47.38 |
| 7,475,900 B2 * | 1/2009 | Cheng | ............... | B62B 7/08 280/47.38 |
| D616,338 S | 5/2010 | Kho et al. | | |
| 7,766,366 B2 * | 8/2010 | Li | ............... | B62B 7/08 280/642 |

(Continued)

FOREIGN PATENT DOCUMENTS

TW          M453624          5/2013

*Primary Examiner* — Jeffrey J Restifo
(74) *Attorney, Agent, or Firm* — Muncy, Geissler, Olds & Lowe, P.C.

(57) ABSTRACT

An assembling structure of double stroller comprises a first assembling part, a second assembling part and a third assembling part. The first assembling part comprises a first seat, two first frames, a handle, and a first accommodation region allowed for the first seat to be disposed. The second assembling part comprises a second seat, two second frames, and a plurality of wheels, as well as a second accommodation region allowed for the second seat to be disposed. The third assembling part comprises first connecting parts, each being connected to each of the first frames at one end far away from the handle, and second connecting parts, each being connected to each of the second frames at one end far away from the second seat. Moreover, each of the first frames is inclined with respect to each of the second frames to form an L-shaped installation.

7 Claims, 7 Drawing Sheets

(56) References Cited

U.S. PATENT DOCUMENTS

| Patent/Publication No. | | Date | Inventor | Classification |
|---|---|---|---|---|
| 8,322,745 | B2* | 12/2012 | Li | B62B 7/08 280/47.4 |
| 8,328,208 | B2* | 12/2012 | Chen | B60N 2/2848 280/47.38 |
| 8,602,441 | B2* | 12/2013 | Li | B62B 7/08 280/47.4 |
| 8,857,829 | B2* | 10/2014 | Cheng | B62B 7/008 280/47.38 |
| 8,905,427 | B2* | 12/2014 | Katz | B60B 33/0002 280/47.38 |
| 8,955,869 | B2* | 2/2015 | Zehfuss | B62B 7/008 280/642 |
| 9,260,128 | B2* | 2/2016 | Liu | B62B 7/08 |
| 2003/0020259 | A1* | 1/2003 | Tai | B62B 7/08 280/647 |
| 2003/0227157 | A1* | 12/2003 | Bretschger | B62B 7/083 280/642 |
| 2004/0094935 | A1* | 5/2004 | Fair | B62B 7/08 280/642 |
| 2009/0039620 | A1* | 2/2009 | Ryan | B62B 9/26 280/647 |
| 2010/0038886 | A1* | 2/2010 | Greger | B62B 7/008 280/642 |
| 2010/0072732 | A1* | 3/2010 | Offord | B62B 9/28 280/647 |
| 2010/0078916 | A1* | 4/2010 | Chen | B60N 2/2848 280/648 |
| 2010/0109292 | A1* | 5/2010 | Chen | B62B 9/26 280/642 |
| 2010/0140902 | A1* | 6/2010 | Zehfuss | B62B 7/008 280/650 |
| 2011/0012325 | A1* | 1/2011 | Gower | B62B 7/008 280/648 |
| 2011/0025022 | A1* | 2/2011 | Li | B62B 7/08 280/647 |
| 2012/0098219 | A1* | 4/2012 | Haut | B62B 7/008 280/47.38 |
| 2013/0049331 | A1* | 2/2013 | Di Carimate | B62B 7/008 280/650 |
| 2013/0106078 | A1* | 5/2013 | Li | B62B 7/10 280/650 |
| 2013/0264787 | A1* | 10/2013 | Cheng | B62B 7/008 280/47.38 |
| 2014/0015228 | A1* | 1/2014 | Kikui | B62B 7/008 280/650 |
| 2014/0191483 | A1* | 7/2014 | Rolicki | B62B 7/04 280/47.41 |
| 2016/0001804 | A1* | 1/2016 | Pacella | B62B 7/145 280/647 |
| 2016/0001805 | A1* | 1/2016 | Pacella | B62B 7/145 280/47.38 |
| 2016/0229439 | A1* | 8/2016 | Zhong | B62B 7/008 |

\* cited by examiner

ASSEMBLING STRUCTURE OF DOUBLE STROLLER

FIELD OF THE INVENTION

The present invention is related to an assembling structure of double stroller, particularly to an assembling structure of double stroller with superior space utilization efficiency.

BACKGROUND OF THE INVENTION

Baby strollers are common baby carriages, facilitating easy trip with children in family outings and reducing burdens on numerous parents. Thereby, the willingness for family outings may be improved, and close parent-child relationship is then achieved. Recently, the styles of strollers bring forth the new through the old, and consideration of requirements for products is more delicate. For instance, a baby stroller with two seats is provided to be chosen by the family with two toddlers.

The conventional baby stroller with two seats, as disclosed in Taiwan patent no. M453624, is allowed for children to be seated side by side, such that both of the two children are permitted to enjoy the scenery along the way. A wider body of the side-by-side baby stroller is, however, relatively inconvenient for motion and accommodation. Moreover, more significant difference in body weight possibly due to different ages of the two children is apt to cause uneasy manipulation as a result of excursion of the center of gravity. Furthermore, the cumbersome and blunt look is appeared.

In view of above disadvantages of the side-by-side stroller, a tandem baby stroller is additionally launched by the industry. The length of body of such a stroller is affected in response of various seat arrangements. In U.S. Pat. No. 8,955,869B2, for example, it could be seen that, in FIG. 3 of this patent, a front wheel and a rear wheel are connected with two connecting rods, respectively, while a seat is mounted on the joint of the two connecting rods and elevated to a distance above the ground. Moreover, another set of frame and seat is additionally mounted. In this manner, the longitudinal interval between two seats are longer, such that the child on the front seat is more far away from parent, and is apt to be situated at the blind spot, so as to be attended difficulty. Further, as disclosed in U.S. Pat. No. D616,338, one of the seats is elevated to configure two seats in a superposed manner. In this connection, besides the increase in whole height of the stroller, trouble in putting the baby in the seat due to a narrow space between seats may occur. Accordingly, how to eliminate the drawbacks resulted from inferior space utilization efficiency of the conventional tandem two-seat baby stroller is truly the problem to be overcome by the industry desirably.

SUMMARY OF THE INVENTION

It is the object of the present invention to solve the problem of inferior space utilization efficiency of the seat in the prior art.

For achieving the above object, the present invention provides an assembling structure of double stroller; comprising a first assembling part, a second assembling part and a third assembling part. The first assembling part comprises a first seat, two first frames respectively connected at two sides of the first seat, a handle connected to each of the first frames, and a first accommodation region situated between each of the first frames and allowed for the first seat to be disposed. The second assembling part comprises a second seat, two second frames respectively connected at two sides of the second seat, a plurality of wheels connected to the second frames at one side far away from the second seat, and a second accommodation region situated between each of the second frames and allowed for the second seat to be disposed. The third assembling part comprises first connecting parts, each being connected to each of the first frames at one end far away from the handle, and second connecting parts, each being connected to each of the second frames at one end far away from the second seat. Moreover, each of the first frames is inclined with respect to each of the second frames to form an L-shaped installation.

Further, the third assembling part comprises two reinforcing rods, each reinforcing rod bridging each of the first frames and each of the second frames at one side where these two frames are adjoined. Each of the reinforcing rods is connected at two ends thereof to one of the first frames and one of the second frames, respectively.

Further, the third assembling part comprises a compression plate provided between each of the reinforcing rods.

Further, the second assembling part comprises two brackets connected to the second seat at two sides thereof, respectively, and two positioning parts respectively provided on the second frames and corresponded to each of the brackets. The second seat, moreover, is fixed to each of the second frames via each of the brackets and each of the positioning parts.

Further, each of the brackets comprises a longitudinal connecting rod extended from the center of the second seat toward one of the second frames, a fastener connected to the longitudinal connecting rod at one side thereof; and a transverse connecting rod connected to the longitudinal connecting rod and extended far away from the fastener, as well as a rolling wheel connected to the end of the transverse connecting rod. Each of the positioning parts comprises a fastening slot provided on one of the second frames and corresponded to the fastener, as well as a slide rail far away from the fastening slot and provided for the rolling wheel to move and rotate therein.

Further, each of the positioning parts comprises a locking rod extended from the fastening slot toward the other positioning part. Each of the brackets comprises a turning tab, as well as a locking hole openly provided on the turning tab and corresponded to the locking rod.

Further, the first seat is pivoted to each of the first frames, and the first seat may be pivoted within the first accommodation region.

Further, the second seat is pivoted to each of the second frames, and the second seat may be pivoted within the second accommodation region.

Further, an inclination angle of each of the first frames with respect to each of the second frames may be in the range of 55 degrees to 65 degrees.

Therefore, the advantageous effect, in comparison with the prior art, to be achieved by the present invention is that:

1. The present invention provides a double stroller with light and handy body, stable structure and superior safety. The L-shaped connection is adopted between the first frame and the second frame of the present invention. In such a spatial arrangement, the increase in length and the increase in height of the stroller are balanced with each other, and the space in the proximity of the wheel is utilized effectively, so as to eliminate the drawback of poor space utilization efficiency of the conventional double stroller. The novel sense of design, meanwhile, is created.

DETAILED DESCRIPTION OF THE PREFERRED EMBODIMENTS

Figure 1:
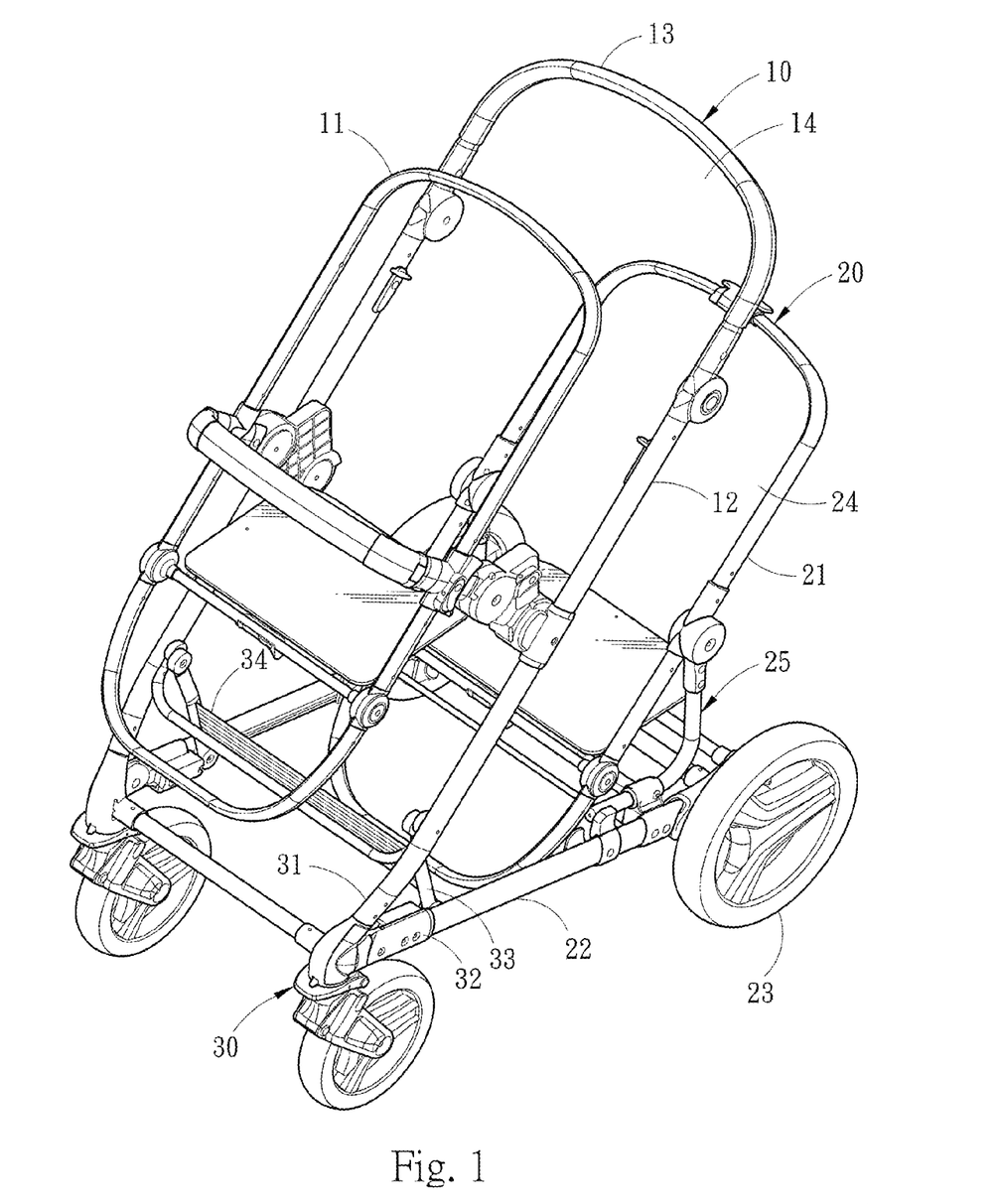
FIG. 1 is a perspective view of a first embodiment of the present invention.
Figure 2:
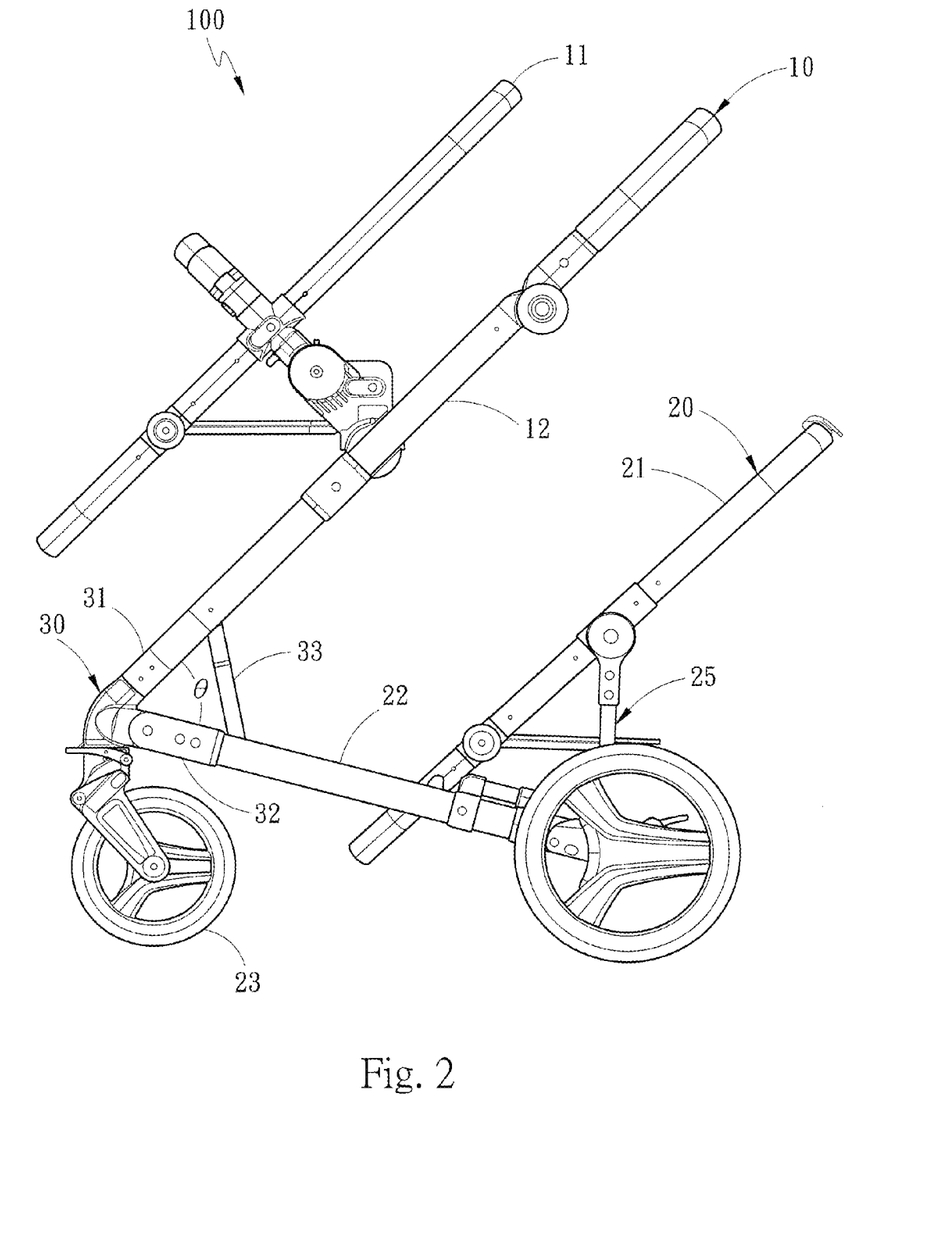
FIG. 2 is a side view of the first embodiment of the present invention.
Figure 3:
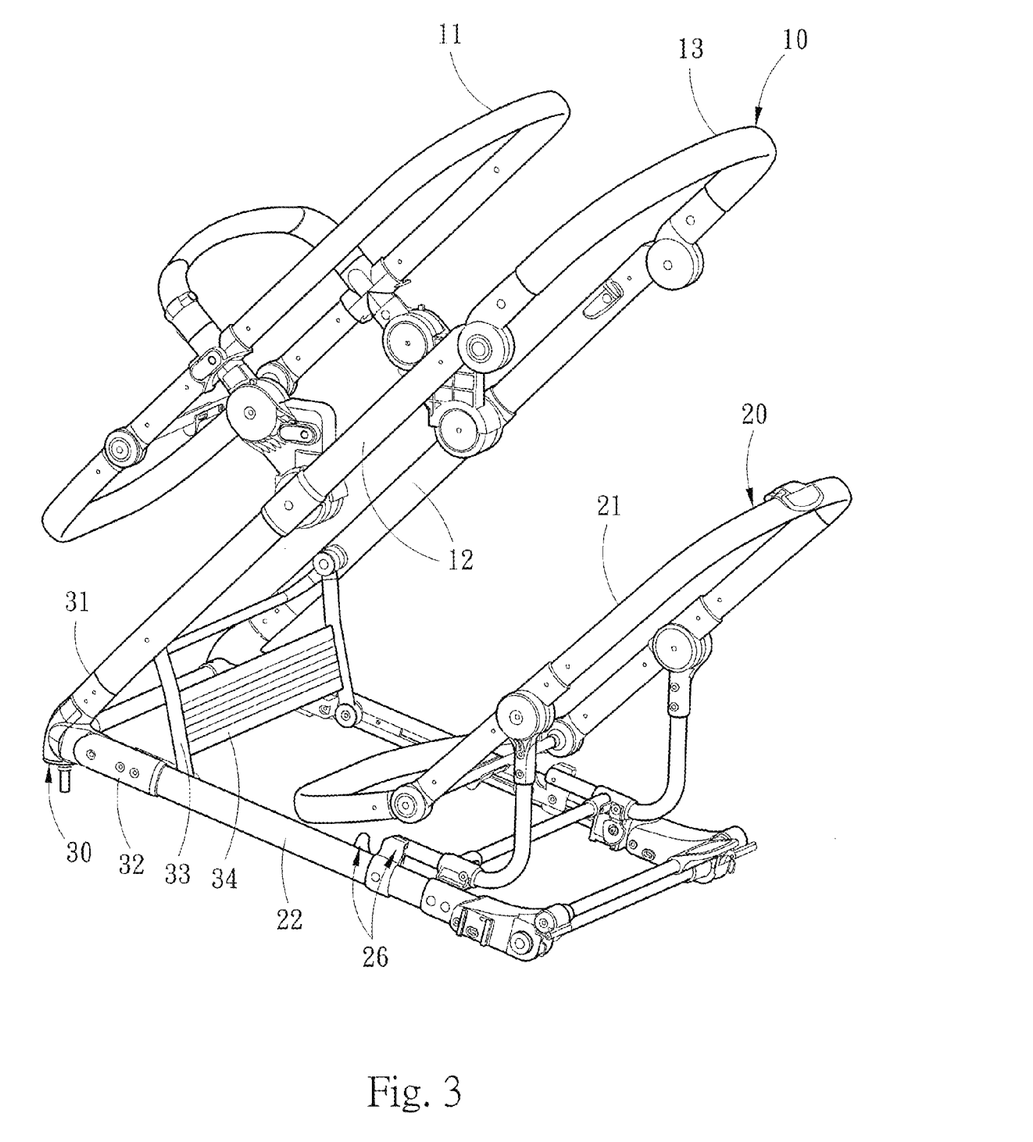
FIG. 3 is another side view of the first embodiment of the present invention.

In regard to the technology of the present invention, referring to FIGS. 1 to 3, the present invention is related to providing an assembling structure of double stroller, comprising a first assembling part 10, a second assembling part 20 and a third assembling part 30. In this case, the first assembling part 10 and the second assembling part 20 are mainly used as a supporting frame for seats of children, while integrally combined via the third assembling part 30.

Specifically, the first assembling part 10 comprises a first seat 11, two first frames 12 respectively connected at two sides of the first seat 11, a handle 13 connected to each of the first frames 12, and a first accommodation region 14 situated between each of the first frames 12 and allowed for the first seat 11 to be disposed. In this embodiment, a framework is composed of each of the first frames 12 together with the handle 13 for surrounding the first seat 11. The first seat 11 is pivoted to each of the first frames 12, and the first seat 11 may be pivoted within the first accommodation region 14, such that an inclination angle of the first seat 11 may be adjusted by a user to facilitate putting a child into the first seat 11.

Subsequently, the second assembling part 20 comprises a second seat 21, two second frames 22 respectively connected at two sides of the second seat 21, a plurality of wheels 23 connected to the second frames 22 at one side far away from the second seat 21, and a second accommodation region 24 situated between each of the second frames 22 and allowed for the second seat 21 to be seated. In one embodiment, the first seat 11 and the second seat 21 may be covered with soft cloth, foam and etc., so as to constitute the seats for children to be seated. Further, the second seat 21 is pivoted to each of the second frames 22, and the second seat 21 may be pivoted within the second accommodation region 24, such that an inclination angle of the second seat 21 may be adjusted by a user to facilitate putting a child into the second seat 21.

The third assembling part 30 comprises first connecting parts 31, each being connected to each of the first frames 12 at one end far away from the handle 13, and second connecting parts 32, each being connected to each of the second frames 22 at one end far away from the second seat 21. Moreover, each of the first frames 12 is inclined with respect to each of the second frames 22 to form an L-shaped installation. Preferably, an inclination angle of each of the first frames 12 with respect to each of the second frames 22 may be in the range of 55 degrees to 65 degrees. As a result of the above structure, the whole length and height of the stroller may be adjusted on the basis of condition of installation of the first seat 11 and the second seat 21. Moreover, the distance between the second seat 21 and the wheel 23 is shorter, without a waste of space at the bottom due to elevation. Therefore, the problem of inferior space utilization efficiency in the prior art may be solved.

Further, for the enhancement of structural strength in the present invention, the third assembling part 30 comprises two reinforcing rods 33, each reinforcing rod bridging each of the first frames 12 and each of the second frames 22 at one side where these two frames are adjoined. Each of the reinforcing rods 33 is connected at two ends thereof to one of the first frames 12 and one of the second frames 22, respectively. The third assembling part 30 comprises a compression plate 34 provided between each of the reinforcing rods 33. Thereby, the supporting force between the first frames 12 and the second frames 22 may be enhanced.

Figure 4:
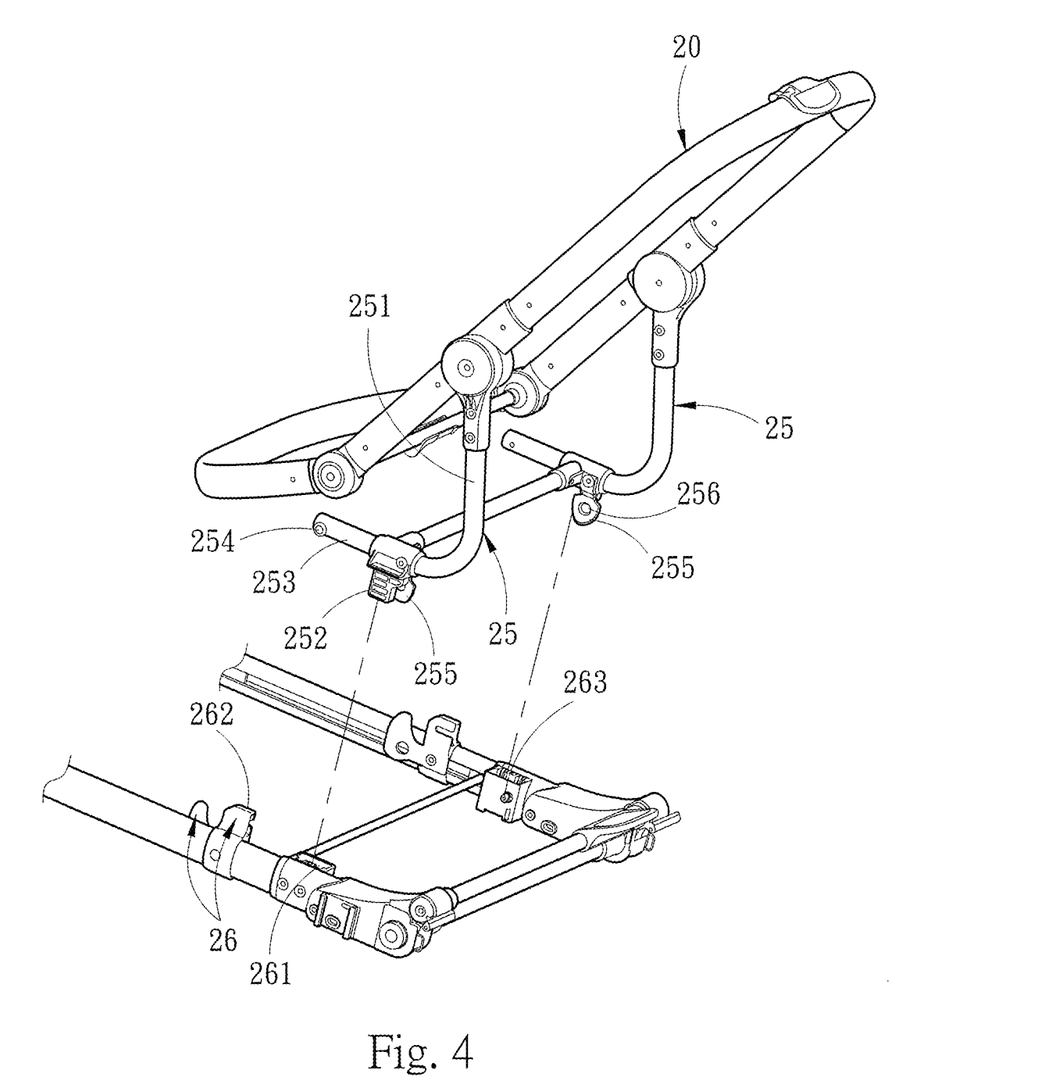
FIGS. 4 to 6 are diagrams of the assembly of a second frame and a second seat of the present invention.
Figure 5:
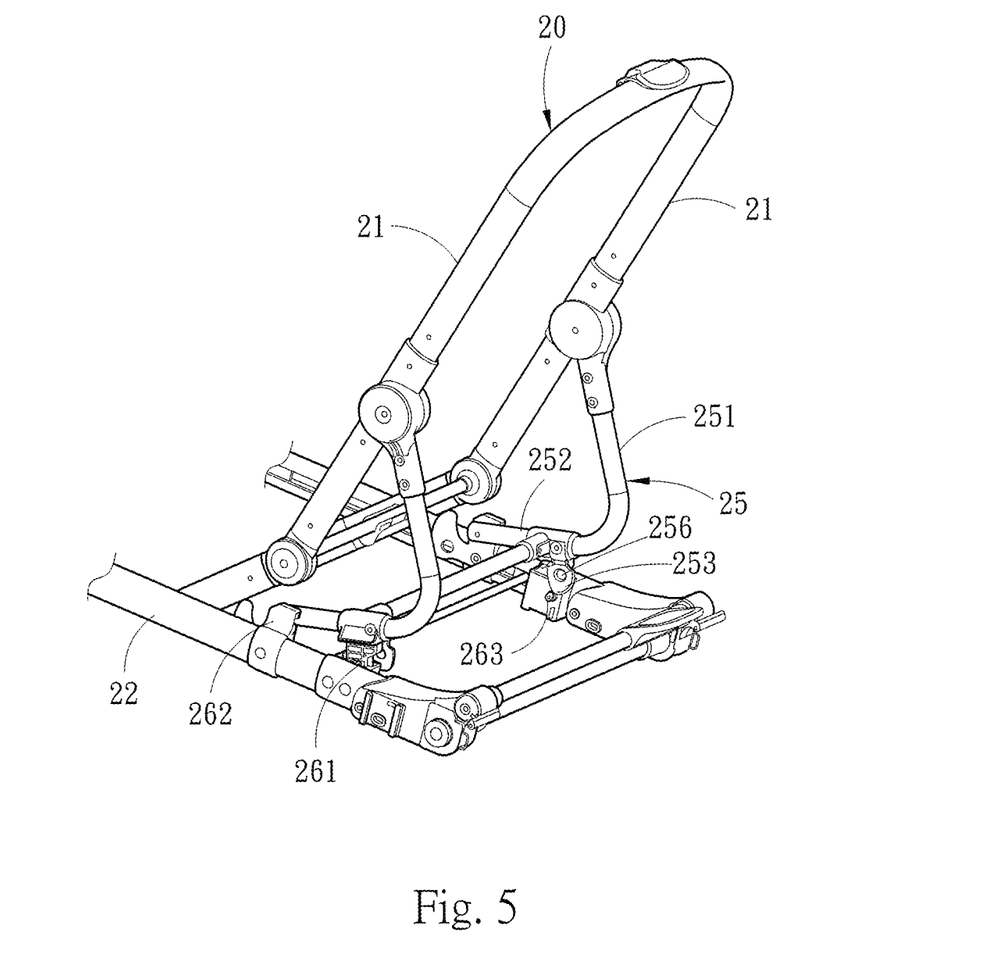
Figure 6:
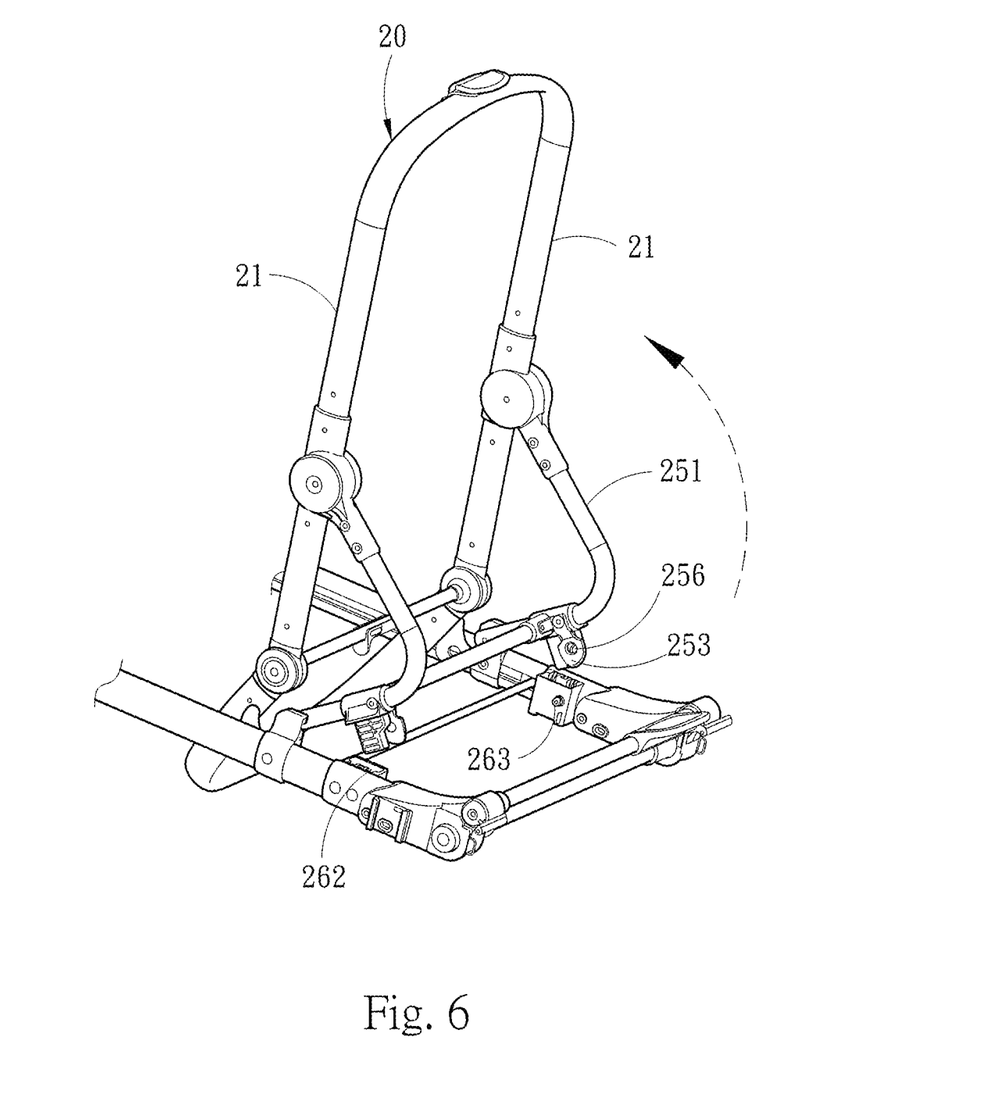

In addition, referring to FIGS. 4 to 6, the second assembling part 20 in this embodiment comprises two brackets 25 connected to the second seat 21 at two sides thereof, respectively, and two positioning parts 26 respectively provided on the second frames 22 and corresponded to each of the brackets 25. The second seat 21, moreover, is fixed to each of the second frames 22 via each of the brackets 25 and each of the positioning parts 26. Each of the brackets 25 comprises a longitudinal connecting rod 251 extended from the center of the second seat 21 toward one of the second frames 22, a fastener 252 connected to the longitudinal connecting rod 251 at one side thereof, and a transverse connecting rod 253 connected to the longitudinal connecting rod 251 and extended far away from the fastener 252, as well as a rolling wheel 254 connected to the end of the transverse connecting rod 253. Each of the positioning parts 26 comprises a fastening slot 261 provided on one of the second frames 22 and corresponded to the fastener 252, as well as a slide rail 262 far away from the fastening slot 261 and provided for the rolling wheel 254 to move and rotate therein. Thereby, it is easy for the user to combine the second seat 21 and the second frame 22, or dismount the second seat 21 from the second frame 22.

In another embodiment, each of the positioning parts 26 comprises a locking rod 263 extended from the fastening slot 261 toward the other positioning part 26. Each of the brackets 25 comprises a resilient turning tab 255, as well as a locking hole 256 openly provided on the turning tab 255 and corresponded to the locking rod 263. In the process of connecting each of the positioning parts 26 to each of the brackets 25 by the user, the turning tab 255 is inwardly pushed aside by the locking rod 263, and the turning tab 255 is then allowed to rebound for fastening onto the locking rod 263 when the locking rod 263 is fastened into the locking hole 256. The user is also allowed to push aside each of the turning tabs 255 and lift each of the brackets 25, such that each of the brackets 25 is then separated from each of the positioning parts 26.

Figure 7:
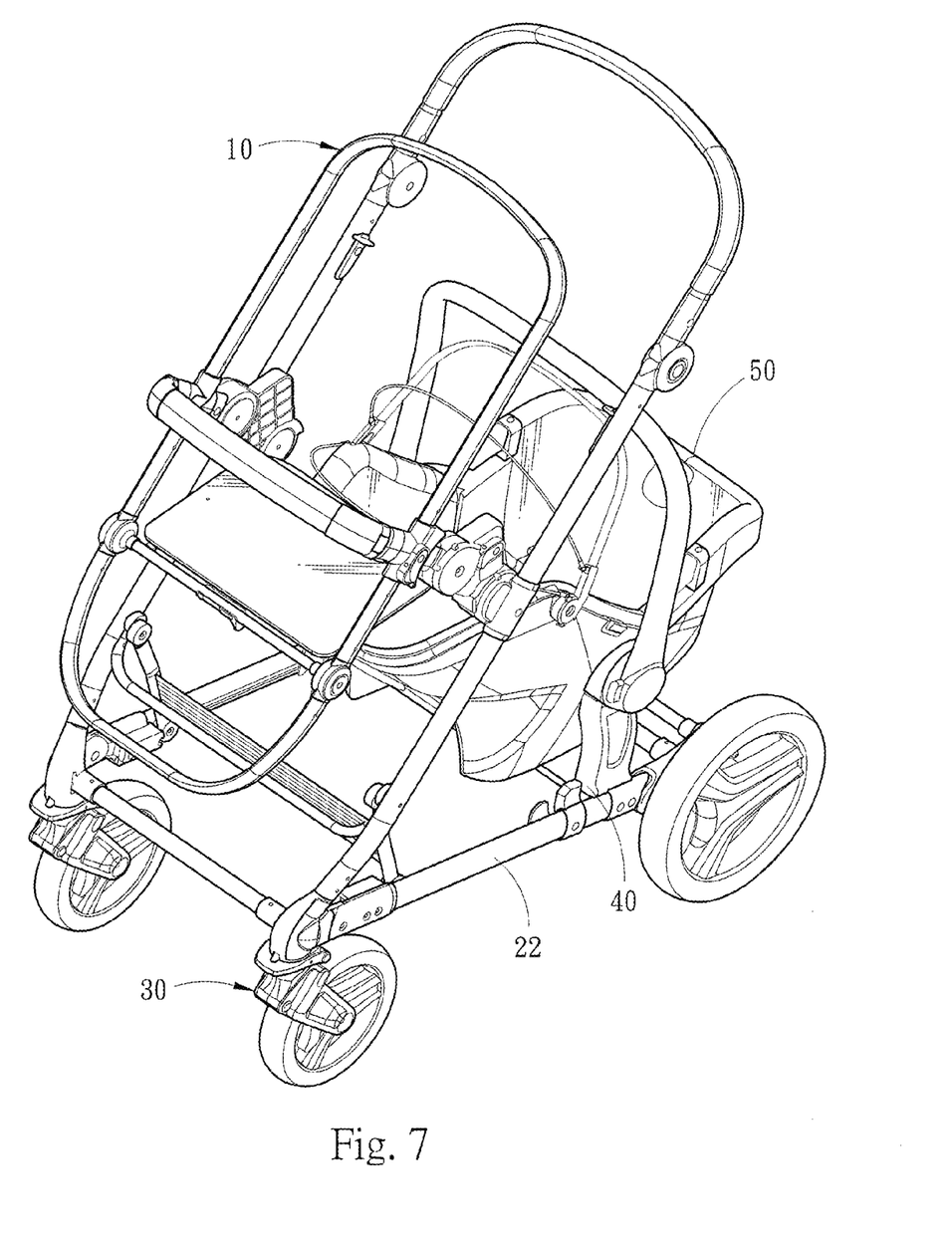
FIG. 7 is a perspective view of a second embodiment of the present invention.

Additionally, referring to FIG. 7, the second seat 21 may be also dismantled and replaced by two elevating elements 40 used for connecting to a baby basket 50 in the present invention. This type of stroller is suitable for a little baby. The baby seat and basket are fairly common components in this field, and the structure thereof should not be described further herein.

To sum up, the present invention provides a double stroller with light and handy body, stable structure and superior safety. The L-shaped connection is adopted between the first frame 12 and the second frame 22 of the present invention. In such a spatial arrangement, the increase in length and the increase in height of the stroller are balanced, and the space in the proximity of the wheel 23 is utilized effectively, so as to eliminate the drawback of poor space utilization efficiency of the conventional double stroller. The novel sense of design, meanwhile, is created.

What is claimed is:

1. An assembling structure of double stroller, comprising:
    a first assembling part, comprising a first seat, two first frames respectively connected at two sides of the first seat, a handle connected to each of the first frames, and a first accommodation region situated between each of the first frames and allowed for the first seat to be disposed;
    a second assembling part, comprising a second seat, two second frames respectively connected at two sides of the second seat, a plurality of wheels connected to the second frames at one side far away from the second seat, and a second accommodation region situated between each of the second frames and allowed for the second seat to be disposed; and
    a third assembling part, comprising first connecting parts, each being connected to each of the first frames at one end far away from the handle, and second connecting parts, each being connected to each of the second frames at one end far away from the second seat, each of the first frames being inclined with respect to each of the second frames to form an L-shaped installation;
    wherein the third assembling part comprises two reinforcing rods, each reinforcing rod bridging each of the first frames and each of the second frames at one side where these two frames are adjoined, each of the reinforcing rods being connected at two ends thereof to one of the first frames and one of the second frames, respectively; and
    wherein the third assembling part further comprises a compression plate provided between each of the reinforcing rods.

2. The assembling structure of double stroller according to claim 1, wherein the second assembling part comprises two brackets connected to the second seat at two sides thereof, respectively, and two positioning parts respectively provided on the second frames and corresponded to each of the brackets, and wherein the second seat is fixed to each of the second frames via each of the brackets and each of the positioning parts.

3. The assembling structure of double stroller according to claim 2, wherein each of the brackets comprises a longitudinal connecting rod extended from the center of the second seat toward one of the second frames, a fastener connected to the longitudinal connecting rod at one side thereof, and a transverse connecting rod connected to the longitudinal connecting rod and extended far away from the fastener, as well as a rolling wheel connected to the end of the transverse connecting rod, each of the positioning parts comprising a fastening slot provided on one of the second frames and corresponded to the fastener, as well as a slide rail far away from the fastening slot and provided for the rolling wheel to move and rotate therein.

4. The assembling structure of double stroller according to claim 3, wherein each of the positioning parts comprises a locking rod extended from the fastening slot toward the other positioning part, each of the brackets comprising a turning tab, as well as a locking hole openly provided on the turning tab and corresponded to the locking rod.

5. The assembling structure of double stroller according to claim 1, wherein the first seat is pivoted to each of the first frames, and the first seat is capable of being pivoted within the first accommodation region.

6. The assembling structure of double stroller according to claim 1, wherein the second seat is pivoted to each of the second frames, and the second seat is capable of being pivoted within the second accommodation region.

7. The assembling structure of double stroller according to claim 1, wherein an inclination angle of each of the first frames with respect to each of the second frames may be in the range of 55 degrees to 65 degrees.

* * * * *